United States Patent
Hata et al.

(10) Patent No.: US 9,123,476 B2
(45) Date of Patent: Sep. 1, 2015

(54) TAB LEAD AND METHOD OF PRODUCING THE SAME

(71) Applicants: Showa Denko Packaging Co., Ltd., Isehara-shi, Kanagawa (JP); SHOWA DENKO K.K., Minato-ku, Tokyo (JP)

(72) Inventors: Hiroshi Hata, Hikone (JP); Takurou Watanabe, Oyama (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 143 days.

(21) Appl. No.: 13/778,536

(22) Filed: Feb. 27, 2013

(65) Prior Publication Data

US 2014/0072869 A1   Mar. 13, 2014

(30) Foreign Application Priority Data

Feb. 29, 2012  (JP) .................................. 2012-43643

(51) Int. Cl.
| | |
|---|---|
| *H01B 7/00* | (2006.01) |
| *H01G 11/74* | (2013.01) |
| *H01M 2/26* | (2006.01) |
| *H01M 2/30* | (2006.01) |
| *H01M 2/32* | (2006.01) |
| *H01M 10/0585* | (2010.01) |
| *H01G 11/80* | (2013.01) |
| *H01M 10/0525* | (2010.01) |

(52) U.S. Cl.
CPC .............. *H01G 11/74* (2013.01); *H01G 11/80* (2013.01); *H01M 2/266* (2013.01); *H01M 2/30* (2013.01); *H01M 2/32* (2013.01); *H01M 10/0585* (2013.01); *H01M 10/0525* (2013.01); *Y02E 60/13* (2013.01)

(58) Field of Classification Search
None
See application file for complete search history.

(56) References Cited

U.S. PATENT DOCUMENTS

2008/0058858 A1*   3/2008   Smith ........................... 606/199
2010/0216016 A1    8/2010   Seino et al.

FOREIGN PATENT DOCUMENTS

| JP | 3505905 B2 | 3/2004 |
| JP | 2008-251464 | * 10/2008 |
| JP | 2011-249343 A | 12/2011 |

OTHER PUBLICATIONS

Machine Translation of JP2008-251464 obtained from JPO Nov. 12, 2014.*

* cited by examiner

*Primary Examiner* — Patrick Ryan
*Assistant Examiner* — Wyatt McConnell
(74) *Attorney, Agent, or Firm* — Keating & Bennett, LLP

(57) ABSTRACT

A tab lead including a first insulating film made of resin is adhered to one of surfaces of a part of a region of a metal plate in a length direction of the metal plate and a second insulating film made of resin is adhered to the other surface of the part of the region. Both end portions of the first insulating film and both end portions of the second insulating film are integrally welded to each other. First protruding portions protruding outward in a thickness direction of the first insulating film are formed at regions of the first insulating film corresponding to both widthwise side edges of the metal plate and vicinities thereof. Second protruding portions protruding outward in a thickness direction of the second insulating film are formed at regions of the second insulating film corresponding to both widthwise side edges of the metal plate and vicinities thereof.

6 Claims, 7 Drawing Sheets

TAB LEAD AND METHOD OF PRODUCING THE SAME

This application claims priority to Japanese Patent Application No. 2012-43643 filed on Feb. 29, 2012, and the entire disclosure of which is incorporated herein by reference in its entirety.

TECHNICAL FIELD

The present invention relates to a tab lead preferably for use in a secondary battery, such as, e.g., a lithium ion secondary battery, and a tab lead for use in an electrochemical device, such as, e.g., an electric double layer capacitor, etc.

In the specification and claims, the term "length direction" used with respect to a metal plate denotes a direction of connecting both end portions of the metal plate not covered by an insulating film, and the term "width direction" or "widthwise" used with respect to the metal plate denotes a direction perpendicular to the length direction within a surface of the metal plate.

In the specification and claims, the term "aluminum" is used to include the meaning of aluminum and its alloys.

In the specification and claims, the term "resin" is used to include the meaning of resin elastomer and rubber.

In the specification and claims, the term "rubber hardness" denotes a degree of rubber hardness (Shore A) (degree) obtained by a measurement compliant with JIS K6253-2006.

BACKGROUND TECHNIQUE

A secondary battery (e.g., a non-aqueous electrolyte lithium secondary battery) and a capacitor are provided with tab leads for extracting electricity to the outside. In a secondary battery, one end of a tab lead is connected to a battery element and clamped by and between opposing outer casing films, and the other end thereof is extended to the outside of the outer casing films. The seal portion of the tab lead which is to be clamped by and between the outer casing films is desired to have excellent adhesiveness by heat sealing.

The outer film is provided with a metal layer, such as, e.g., an aluminum foil, as an intermediate layer. Therefore, in order to prevent short-circuit of the metal layer and the tab lead (metal), an insulating resin film is integrally interposed between the tab lead and the outer casing film.

For example, in anon-aqueous electrolyte battery structured such that a positive electrode, a negative electrode and electrolyte are accommodated in a sealed bag made of a laminated film including a metal foil and that lead wires connected to the electrodes are extended to the outside, it is known to provide an insulating layer which does not melt at the heat sealing temperature of the sealed bag so as to cover the extending portion of the lead wire and an insulating layer which melts at the heat sealing temperature of the sealed bag arranged outside of the insulating layer which does not melt at the heat sealing temperature (see Patent Document 1).

Further, in a battery, it is also known to provide a laminated film including a metal layer and a heat adhesive resin layer containing a heat adhesive resin, a battery element covered by the laminated film, a lead connected to the battery element, clamped by and between the opposing heat adhesive resin layers, and extended to the outside of the laminated film, and a film-like sealant (insulating film) arranged between the lead and the heat adhesive resin layer and including a heat adhesive resin and fine resin fibers mixed with the heat adhesive resin (see Patent Document 2).

Patent Document 1: Japanese Patent No. 3505905
Patent Document 2: Japanese Unexamined Laid-open Patent Application Publication No. 2011-249343

SUMMARY OF THE INVENTION

Problems to be Solved by the Invention

In recent years, there is a demand for a secondary battery and a capacitor to have sufficient durability even under more stringent conditions of use than before. For example, in order to sufficiently prevent possible leakage of electrolyte accommodated in the battery, it is possible to attain the purpose by employing more stringent heat sealing conditions when heat sealing the outer casing to both surfaces of the tab lead as terminals.

However, when employing such more stringent heat sealing conditions than before, short-circuit more likely occurs between the metal plate of the tab lead and the metal layer of the outer casing, causing a problem that sufficient insulation cannot be secured.

The present invention was made in view of the aforementioned technical background, and aims to provide a tab lead capable of securing sufficient insulation without causing short-circuit even if an outer casing is heat sealed to the tab lead under stringent heat sealing conditions, and also to provide a method of producing such a tab lead.

Means for Solving the Problems

To achieve the aforementioned purpose, the present invention provides the following means.

[1] A tab lead comprising:
a metal plate;
a first insulating film made of resin adhered to one of surfaces of a part of a region of the metal plate in a length direction of the metal plate; and
a second insulating film made of resin adhered to the other of surfaces of the part of the region; wherein
both end portions of the first insulating film and both end portions of the second insulating film are integrally welded to each other,
first protruding portions are formed at regions of the first insulating film corresponding to both widthwise side edges of the metal plate and vicinities thereof so as to protrude outward in a thickness direction of the first insulating film, and
second protruding portions are formed at regions of the second insulating film corresponding to both widthwise side edges of the metal plate and vicinities thereof so as to protrude outward in a thickness direction of the second insulating film.

[2] The tab lead as recited in Item [1], wherein
a first protruding rate calculated by a following calculating formula falls within a range of 1-100%, first protruding rate (%)=$\{(X-Y)/Y\} \times 100$, where "X" ($\mu$m) is a maximum thickness of the first protruding portion of the first insulating film, and "Y" ($\mu$m) is a thickness of a portion of the first insulating film corresponding to an intermediate portion of the metal plate in a width direction of the metal plate, and a second protruding rate calculated by a following calculating formula falls within a range of 1-100%, second protruding rate (%)=$\{(V-W)/W\} \times 100$, where "V" ($\mu$m) is a maximum thickness of the second protruding portion of the second insulating film, and "W" ($\mu$m) is a thickness of a portion of the second insulating film corresponding to the intermediate portion of the metal plate in the width direction of the metal plate.

[3] The tab lead as recited in Item [2], wherein a relationship of 100 µm≤Y≤250 µm and a relationship of 100 µm≤W≤250 µm are met.

[4] The tab lead as recited in any one of Items [1] to [3], wherein an apex of the first protruding portion is positioned outside of a widthwise side edge of the metal plate corresponding to the first protruding portion and an apex of the second protruding portion is positioned outside of a widthwise side edge of the metal plate corresponding to the second protruding portion.

[5] A production method of a tab lead in which, in a state in which insulating films made of resin are arranged on both upper and lower surfaces of a metal plate so as to cover a part of a region of the metal plate in a length direction of the metal plate, the insulating films are heat pressed by and between a pair of upper and lower heating and pressure-applying devices, wherein, as the heating and pressure-applying device, a heating and pressure-applying device including a hard member and a resin sheet member having a rubber hardness of 20-95 degrees laminated on an insulating film contact side surface of the hard member is used.

[6] The production method of a tab lead as recited in Item [5], wherein at the time of the heat pressing, a temperature of the heating and pressure-applying device is set to 170-250° C., a pressing force by the heating and pressure-applying device is set to 700-3,000 N, and a time of the heat pressing is set to 3-15 seconds.

[7] A production method of a tab lead in which, in a state in which insulating films made of resin are arranged on both upper and lower surfaces of a metal plate so as to cover a part of a region of the metal plate in a length direction of the metal plate, the insulating films are heat pressed by and between a pair of upper and lower heating and pressure-applying devices, wherein, as the heating and pressure-applying device, a heating and pressure-applying device including a hard member and a resin sheet member laminated on an insulating film contact side surface of the hard member is used, wherein the resin sheet member is provided with protruding portion forming dented portions formed at regions of a surface of the resin sheet member corresponding to both widthwise side edges of the metal sheet and vicinities thereof.

[8] A production method of a tab lead in which, in a state in which insulating films made of resin are arranged on both upper and lower surfaces of a metal plate so as to cover a part of a region of the metal plate in a length direction of the metal plate, the insulating films are heat pressed by and between a pair of upper and lower heating and pressure-applying devices, wherein, as the heating and pressure-applying device, a heating and pressure-applying device including a hard member provided with protruding portion forming dented portions formed at regions of an insulating film contact side surface of the hard member corresponding to both widthwise side edges of the metal sheet and vicinities thereof is used.

[9] A production method of a tab lead in which, in a state in which insulating films made of resin are arranged on both upper and lower surfaces of a metal plate so as to cover a part of a region of the metal plate in a length direction of the metal plate, the insulating films are heat pressed by and between a pair of upper and lower heating and pressure-applying devices, wherein, as the heating and pressure-applying device, a heating and pressure-applying device including a hard member and a resin sheet member laminated on an insulating film contact side surface of the hard member is used, wherein the hard member is provided with protruding portion forming dented portions formed at regions of an insulating film contact side surface of the hard member corresponding to both widthwise side edges of the metal sheet and vicinities thereof, and parts of the resin sheet member are integrally embedded in the protruding portion forming dented portions of the hard member.

[10] The production method as recited in Item [7] or [9], wherein a rubber hardness of the resin sheet member is 20-95 degrees.

Effects of the Invention

According to the invention (tab lead) as recited in Item [1], the first protruding portions are formed at regions of the first insulating film corresponding to both widthwise side edges of the metal plate and vicinities thereof so as to protrude outward in a thickness direction and the second protruding portions are formed at regions of the second insulating film corresponding to both widthwise side edges of the metal plate and vicinities thereof so as to protrude outward in a thickness direction of the second insulating film. Therefore, occurrence of short-circuit between the metal plate of the tab lead and the metal layer of the outer casing can be prevented even if the outer casing is heat sealed to the tab lead under stringent heat sealing conditions. Therefore, even if the outer casing is heat sealed to the tab lead under stringent heat sealing conditions, no short-circuit occurs and sufficient insulation can be secured.

According to the invention [2], short-circuit between the tab lead and the outer casing (including metal layer) can be sufficiently prevented.

According to the invention [3], short-circuit between the tab lead and the outer casing (including metal layer) can be further sufficiently prevented.

According to the invention [4], since it is structured such that the apex of the first protruding portion is positioned outside of a widthwise side edge of the metal plate corresponding to the first protruding portion and an apex of the second protruding portion is positioned outside of the widthwise side edge of the metal plate corresponding to the second protruding portion, short-circuit between the tab lead and the outer casing (including metal layer) can be more assuredly prevented.

According to the invention [5]-[10], the tab lead according to the present invention can be more efficiently produced.

BRIEF EXPLANATION OF THE DRAWINGS

FIG. 4(B) is a cross-sectional view taken along the line F-F in FIG. 4(A).

EMBODIMENTS FOR CARRYING OUT THE INVENTION

Figure 1:
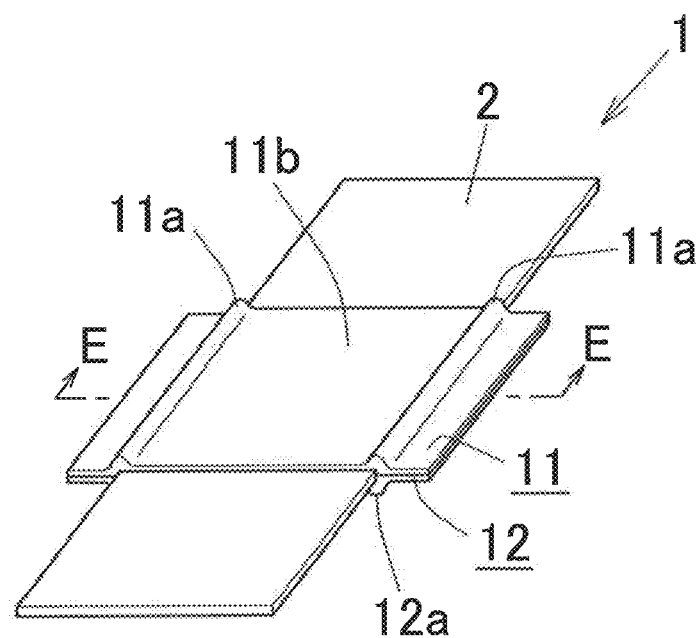
FIG. 1 is a perspective view showing an embodiment of a tab lead according to the present invention.
Figure 2:
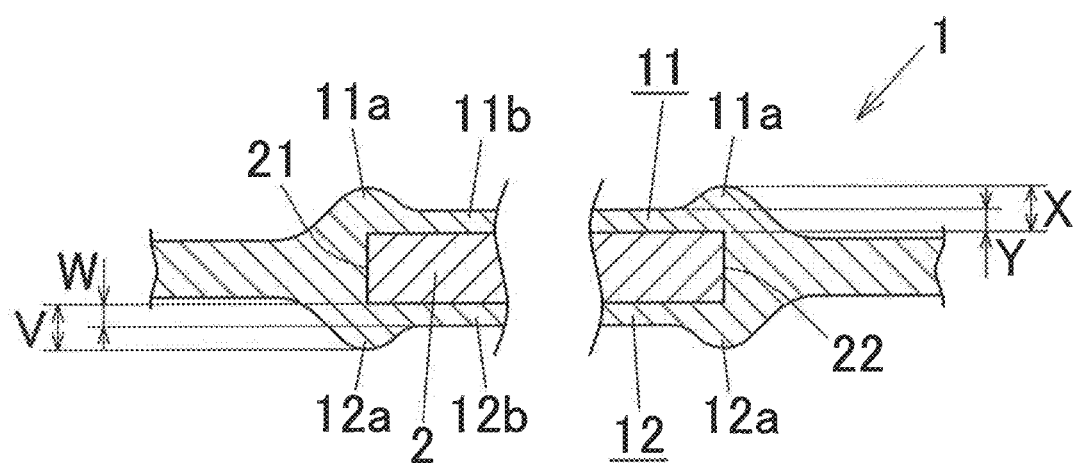
FIG. 2 is a cross-sectional view taken along the line E-E in FIG. 1.

An embodiment of a tab lead 1 according to the present invention is shown in FIGS. 1 and 2. The tab lead 1 is provided with a metal plate 2 rectangular in plan view, a first insulating film 11 made of resin adhered to one of the surfaces (i.e., upper surface) of a part of a region of the metal plate 2 in the length direction of the metal plate 2, and a second insulating film 12 made of resin adhered to the other of the surfaces (i.e., a lower surface) of the part of the region.

Both end portions of the first insulating film 11 (i.e., the left end portion and the right end portion) are each extended outward in a width direction of the metal, plate 2 than the widthwise side edge of the metal plate 2. Also, both end portions of the second insulating film 12 (i.e., the left end portion and the right end portion) are each extended outward in a width direction of the metal plate 2 than the widthwise side edge of the metal plate 2.

One end portion (left end portion) of the first insulating film 11 and one end portion (left end portion) of the second insulating film 12 are integrally welded to each other, and the other end portion (right end portion) of the first insulating film 11 and the other end portion (right end portion) of the second insulating film 12 are integrally welded to each other (see FIGS. 1 and 2).

First protruding portions 11a and 11a are formed at regions of the first insulating film 11 corresponding to both widthwise side edges 21 and 22 of the metal plate 2 and vicinities thereof so as to protrude outward in a thickness direction of the first insulating film 11. Also, second protruding portions 12a and 12a are formed at regions of the second insulating film 12 corresponding to both widthwise side edges 21 and 22 of the metal plate 2 and vicinities thereof so as to protrude outward in a thickness direction of the second insulating film 12 (see FIG. 2).

The intermediate portion of the first insulating film 11 between the first protruding portions 11a and 11a forms a first flat portion 11b having an even thickness and a flat surface.

Also, the intermediate portion of the second insulating film 12 between the second protruding portions 12a and 12a forms a second flat portion 12b having an even thickness and a flat surface.

The position of the apex of the first protruding portions 11a is located at a position of the first insulating film 11 corresponding to the side edge 21 (22) of the metal plate 2 corresponding to the first protruding portion 11a (i.e., the position right above the side edge 21 (22)), and the position of the apex of the second protruding portion 12a is located at a position of the second insulating film 12 corresponding to the side edge 21 (22) of the metal plate 2 corresponding to the second protruding portion 12a (i.e., the position right below the side edge 21 (22)) (see FIG. 2).

Figure 9:
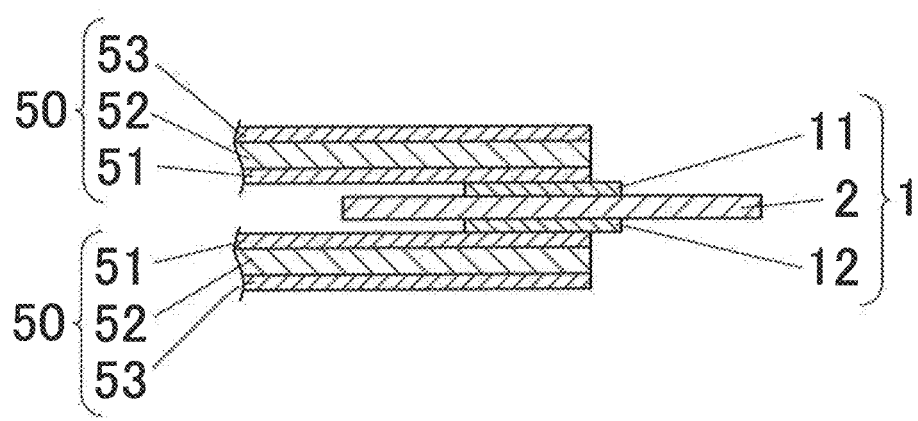
FIG. 9 is a cross-sectional view taken along the line G-G in FIG. 8.

In the tab lead 1 having the aforementioned structure, the first protruding portions 11a and 11a are formed at regions of the first insulating film 11 corresponding to both widthwise side edges 21 and 22 of the metal plate 2 and vicinities thereof so as to protrude outward in the thickness direction of the first insulating film 11, and the second protruding portions 12a and 12a are formed at regions of the second insulating film 12 corresponding to both widthwise side edges 21 and 22 of the metal plate 2 and vicinities thereof so as to protrude outward in the thickness direction of the second insulating film 12. Therefore, even if stringent heat sealing conditions are employed when heat sealing an outer casing body 50 (including a metal layer 52) to the tab lead 1 (in detail, as shown in FIG. 9, when heat sealing the edge portions of the outer casing body 50 to the tab lead 1 in a state in which the edge portions of the outer casing body 50 are arranged so as to sandwich the insulating films 11 and 12 arranged on both surfaces of the intermediate region of the tab lead 1 in the length direction), short-circuit between the metal plate 2 of the tab lead 1 and the metal layer 52 of the outer casing body 50 can be prevented.

In the present invention, it is preferred to employ the following structure in which a first protruding rate calculated by the following calculating formula falls within a range of 1-1.00% and a second protruding rate calculated by the following calculating formula falls within a range of 1-100%.

The first protruding rate is calculated by the following calculating formula:

$$\text{first protruding rate}(\%) = \{(X-Y)/Y\} \times 100,$$

where "X" (μm) is a maximum thickness of the first protruding portion 11a of the first insulating film 11, and "Y" (μm) is a thickness of the first flat portion 11b (the portion of the first insulating film 11 corresponding to the intermediate portion of the metal plate 2 in the width direction of the metal plate 2) of the first insulating film 11.

The second protruding rate is calculated by the following calculating formula:

$$\text{second protruding rate}(\%) = \{(V-W)/W\} \times 100,$$

where "V" (μm) is a maximum thickness of the second protruding portion 12a of the second insulating film 12, and "W" (μm) is a thickness of the second flat portion 12b (the portion of the second insulating film 12 corresponding to the intermediate portion of the metal plate 2 in the width direction of the metal plate 2) of the second insulating film 12.

Figure 3:
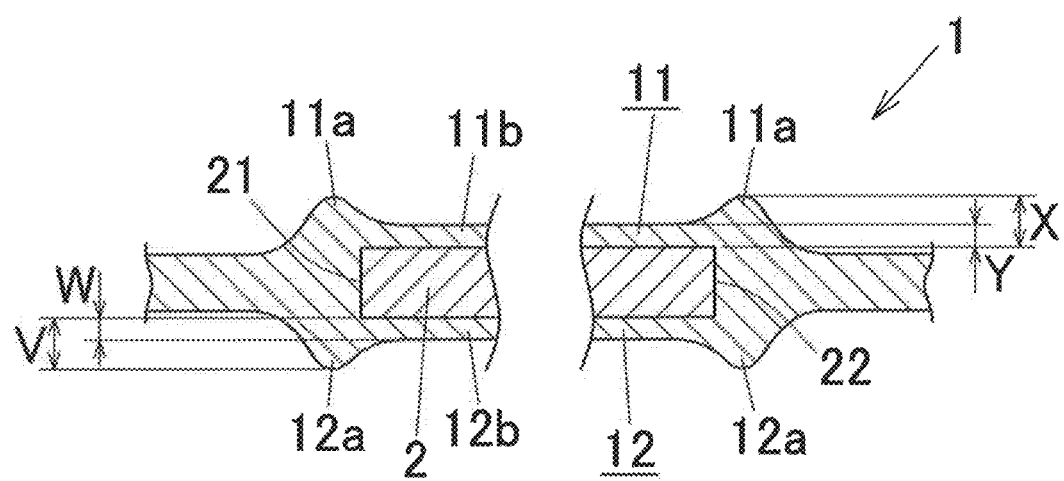
FIG. 3 is a cross-sectional view of another embodiment of a tab lead according to the present invention.

Another embodiment of the tab lead 1 according to the present invention is shown in FIG. 3. In this embodiment, the position of the apex of the first protruding portion 11a is located outside of the widthwise side edge 21 (22) of the metal plate 2 corresponding to the first protruding portion 11a, and the position of the apex of the second protruding portion 12a is located outside of the widthwise side edge 21 (22) of the metal plate 2 corresponding to the second protruding portion 12a. The explanation of the same structural members as in the aforementioned embodiment (shown in FIG. 2) will be omitted by allotting the same symbols to the corresponding portions.

In the tab lead 1 shown in FIG. 3, the position of the apex of the first protruding portion 11a is located outside of the widthwise side edge 21 (22) of the metal plate 2 corresponding to the first protruding portion 11a, and the position of the apex of the second protruding portion 12a is located outside of the widthwise side edge 21 (22) of the metal plate 2 corresponding to the second protruding portion 12a. Accordingly, there is an advantage that short-circuit between the metal plate 2 of the tab lead 1 and the metal layer 52 of the outer casing body 50 can be more assuredly prevented.

The planer shape of the metal plate 2 is not specifically limited, and can be, for example, rectangular or square.

It is preferable that the thickness of the metal plate 2 falls within a range of 0.1-1 mm. The material of the metal plate 2 is not specifically limited. For example, an aluminum plate can be exemplified as a material for a positive electrode, and a copper alloy plate and a copper plate having a surface plated with nickel can be exemplified as a material for a negative electrode.

The planer shape of the first insulating film 11 and the planer shape of the second insulating film 12 are not specifically limited. For example, a rectangular shape, a square shape, etc. can be exemplified.

The thickness Y of the first insulating film 11 and the thickness W of the second insulating film 12 preferably fall within the range of 100-250 μm. The material of the first insulating film 11 and that of the second insulating film 12 are not specifically limited. For example, as the material, polyethylene series resin, polypropylene series resin, polyester series resin and polyvinyl alcohol series resin can be exemplified.

The tab lead 1 having the aforementioned structure can be produced by, for example, the following method. An example of the heating and pressure-applying device 30 used in the production method is shown in FIG. 4.

The heating and pressure-applying device 30 is provided with a hard member 31 and a resin sheet member 33 integrally laminated on the insulating film contact side surface of the hard member 31. As the resin sheet member 33, a resin sheet member having a rubber hardness of 20-95 degrees can be used. Two heating and pressure-applying devices 30 are prepared and used in a manner such that the resin sheet members 33 face each other with one arranged on the upper side and the other arranged on the lower side (see FIG. 4).

Figure 4:
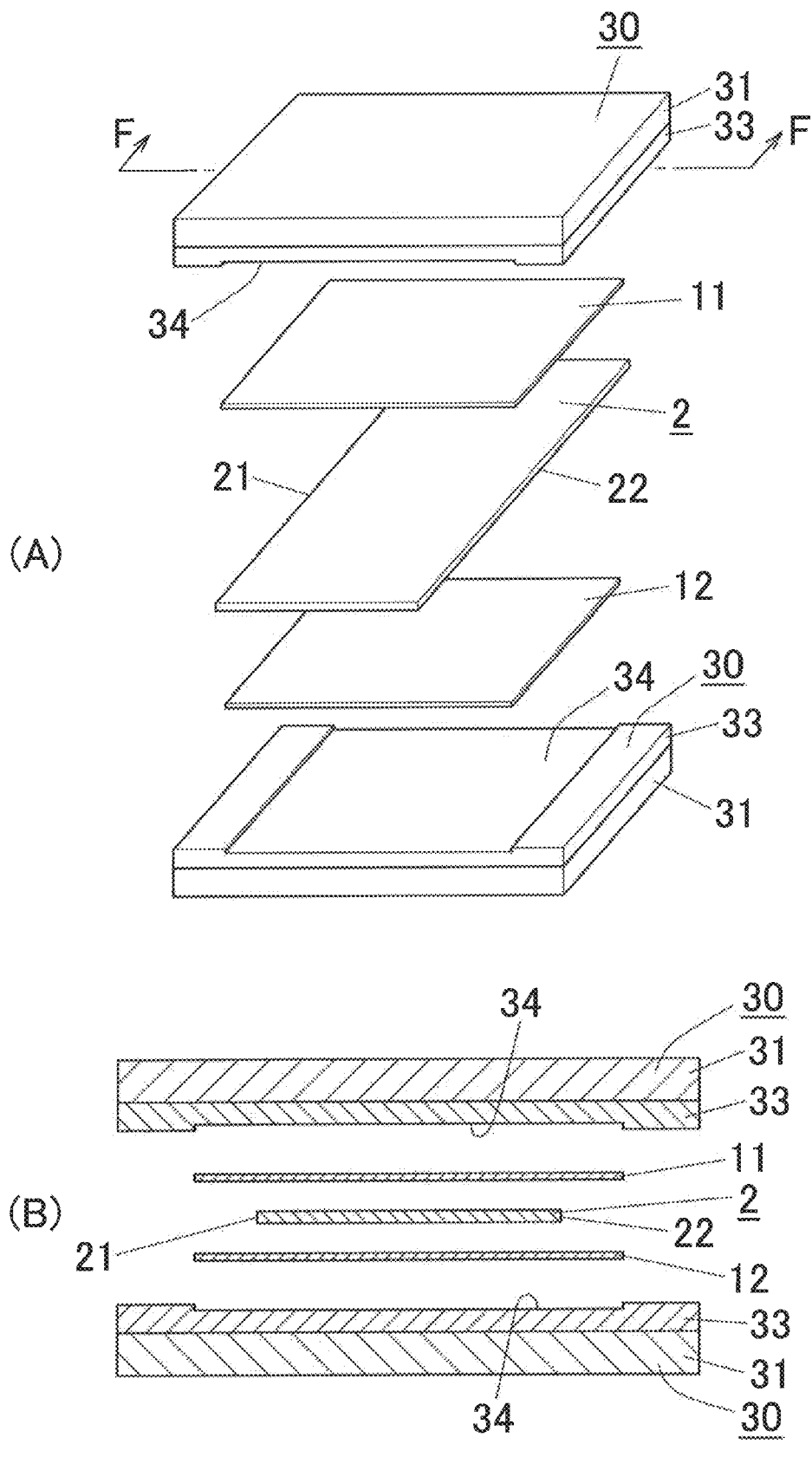
FIG. 4 is a view showing an example of a method of producing the tab lead according to the present invention, wherein FIG. 4 (A) is a perspective view thereof

In a state in which insulating films 11 and 12 made of resin are arranged on both upper and lower surfaces of the metal plate 2 so as to cover a part of the region of the metal plate 2 in the length direction, the insulating films 11 and 12 are sandwiched by and between the upper and lower pair of heating and pressure-applying devices 30 and 30 and heat pressed (see FIG. 4). At this time, the heat pressing is performed in a state in which the flat surface of the dented portion 34 of the lower surface of the resin sheet member 33 of the upper heating and pressure-applying device 30 contacts the upper surface of the upper insulating film 11, and the flat surface of the dented portion 34 of the upper surface of the resin sheet member 33 of the lower heating and pressure-applying device 30 contacts the lower surface of the lower insulating film 12.

By performing the heat pressing, the tab lead 1 as shown in FIGS. 1 to 3 can be obtained. In other words, the following tab lead 1 can be produced. In the tab lead 1, the first insulating film 11 made of resin is adhered to one of the surfaces of a part of a region of the metal plate 2 in the length direction. The second insulating film 12 made of resin is adhered to the other surface of the part of the region. Both end portions of the first insulating film 11 and both end portions of the second insulating film 12 are integrally welded to each other. The first protruding portions 11a and 11a are formed at regions of the first insulating film 11 corresponding to both widthwise side edges 21 and 22 of the metal plate 2 and vicinities thereof so as to protrude outward in the thickness direction of the first insulating film 11. The second protruding portions 12a and 12a are formed at regions of the second insulating film 12 corresponding to both widthwise side edges 21 and 22 of the metal plate 2 and vicinities thereof so as to protrude outward in the thickness direction of the second insulating film 12.

In the production method using the heating and pressure-applying devices 30 as shown in FIG. 4, at the time of the heat pressing, the temperature of the heating and pressure-applying devices 30 is preferably set to 170-250° C. Also, at the time of the heat pressing, the applying pressure by the heating and pressure-applying devices 30 is preferably set to 700-3,000 N. In addition, at the time of the heat pressing, the heat pressing time is preferably set to 3-15 seconds. It is especially preferable to meet these three preferable conditions. In this case, even if a protruding portion forming dented portion is not formed on the heating and pressure-applying device 30, a tab lead 1 having the first protruding portions 11a and 11a and the second protruding portions 12a and 12a can be assuredly produced.

Figure 5:
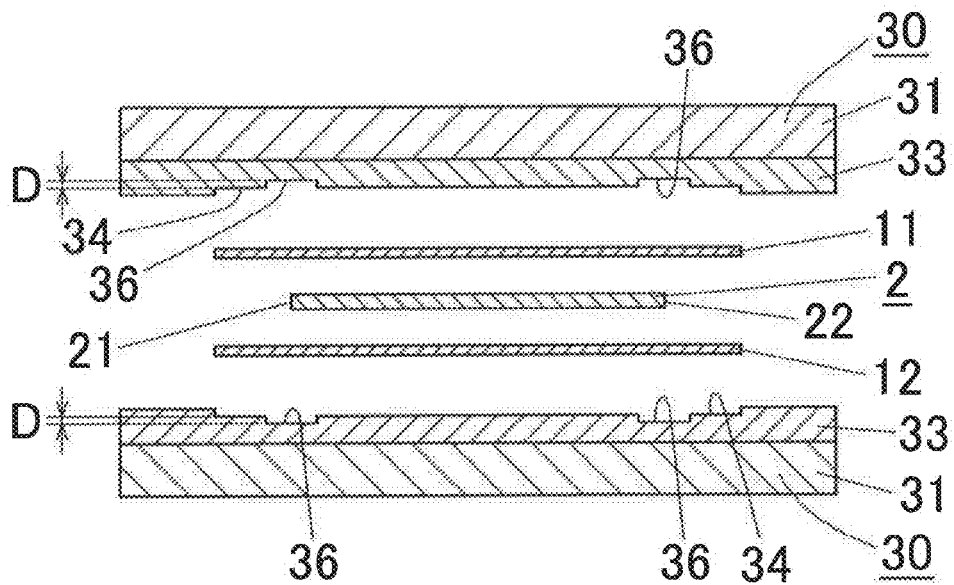
FIG. 5 is a cross-sectional view showing another example of a heating and pressure-applying device used in a method of producing the tab lead according to the present invention.
Figure 6:
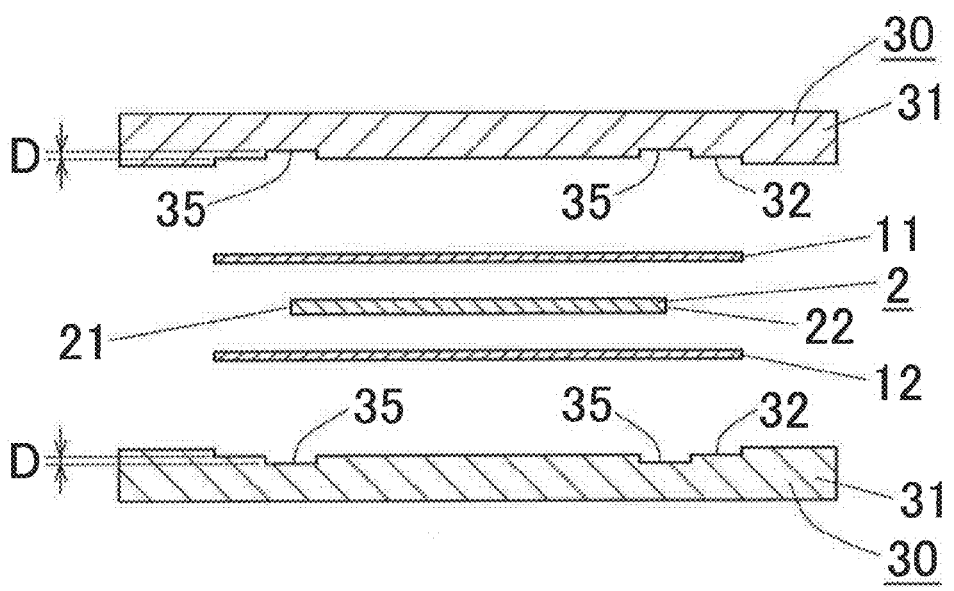
FIG. 6 is a cross-sectional view showing still another example of the heating and pressure-applying device used in a method of producing the tab lead according to the present invention.
Figure 7:
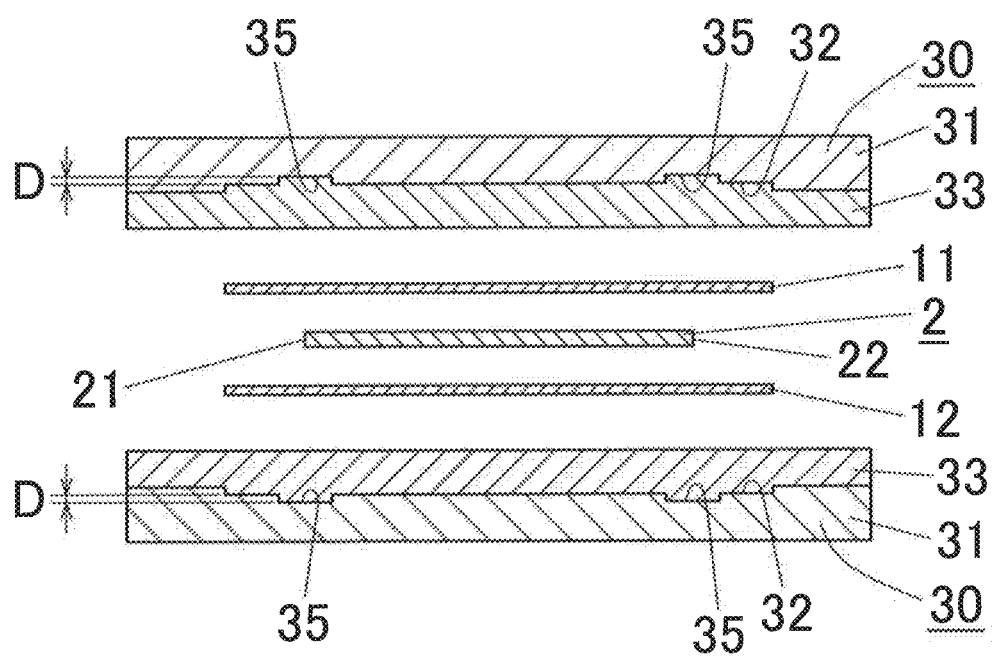
FIG. 7 is a cross-sectional view showing still yet another example of the heating and pressure-applying device used in a method of producing the tab lead according to the present invention.

The tab lead 1 having the structure as shown in FIG. 1 to 3 can be produced by using the heating and pressure-applying device 30 as shown in FIG. 5 to 7 in place of the heating and pressure-applying device 30 as shown in FIG. 4.

The heating and pressure-applying device 30 as shown in FIG. 5 is provided with a hard member 31 and a resin sheet member 33 laminated on an insulating film contact side surface of the hard member 31. Protruding portion forming dented portions 36 and 36 are formed at regions of the dented portions 34 formed on the surface (non-laminated surface) of the resin sheet members 33 corresponding to both widthwise sides edges 21 and 22 of the metal plate 2 and vicinities thereof.

Heat pressing is performed using two heating and pressure-applying devices 30 and 30 in the same manner as mentioned above. In this case, heat pressing is performed in a state in which the lower surface of the dented portion 34 of the resin sheet member 33 of the upper heating and pressure-applying device 30 is in contact with the upper surface of the upper insulating film 11 and the upper surface of the dented portion 34 of the resin sheet member 33 of the lower heating and pressure-applying device 30 is in contact with the lower surface of the lower insulating film 12. At this time, since the protruding portion forming dented portions 36 and 36 are formed at the regions of the dented portion 34 formed on the surface of the resin sheet member 33 (non-laminated surface) corresponding to both widthwise side edges 21 and 22 of the metal plate 2 and the vicinities thereof, the following tab lead 1 (as shown in FIGS. 1 to 3) can be produced. In the tab lead 1, first protruding portions 11a and 11a protruded outward in the thickness direction of the first insulating film 11 are formed at regions of the first insulating film 11 corresponding to both widthwise side edges 21 and 22 of the metal plate 2 and vicinities thereof, and second protruding portions 12a and 12a protruded outward in the thickness direction of the second insulating film 12 are formed at regions of the second insulating film 12 corresponding to both widthwise side edges 21 and 22 of the metal plate 2 and vicinities thereof.

The heating and pressure-applying device 30 shown in FIG. 6 is provided with a hard member 31. The hard member 31 includes protruding portion forming dented portions 35 and 35 formed at regions of the insulating film contact surface of the hard member 31 corresponding to both widthwise side edges 21 and 22 of the metal plate 2 and vicinities thereof.

Heat pressing is performed using these two heating and pressure-applying devices 30 and 30 in the same manner as mentioned above. In this case, heat pressing is performed in a state in which the lower surface of the dented portion 32 of the hard member 31 of the upper heating and pressure-applying device 30 is in contact with the upper surface of the upper insulating film 11 and the upper surface of the dented portion 32 of the hard member 31 of the lower heating and pressure-applying device 30 is in contact with the lower surface of the lower insulating film 12. At this time, the protruding portion forming dented portions 35 and 35 are formed at the regions of the dented portion 32 on the surface of the hard member 31 corresponding to both widthwise side edges 21 and 22 of the metal plate 2 and vicinities thereof. Therefore, the tab lead 1 (as shown in FIGS. 1 to 3) can be produced in which the first protruding portions 11a and 11a are formed at regions of the first insulating film 11 corresponding to both widthwise side edges 21 and 22 of the metal plate 2 and vicinities thereof so as to protrude outward in the thickness direction of the first insulating film 11, and the second protruding portions 12a and 12a are formed at regions of the second insulating film 12 corresponding to both widthwise side edges 21 and 22 of the metal plate 2 and vicinities thereof so as to protrude outward in the thickness direction of the second insulating film 12.

A heating and pressure-applying device 30 as shown in FIG. 7 is provided with a hard member 31 and a resin sheet member 33 laminated on an insulating film contact side surface of the hard member 31. In this device, protruding portion forming dented portions 35 and 35 are formed at regions of the dented portion 32 formed on the contact side of the hard member 31 corresponding to both widthwise side edges 21 and 22 of the metal plate 2 and vicinities thereof and parts of the resin sheet member 33 are integrally embedded in the dented portion 32 and the protruding portion forming dented portions 35 and 35 of the hard member 31. The surface of the resin sheet member 33 (non-laminated surface) is formed into a flat surface.

Heat pressing is performed using these two heating and pressure-applying devices 30 in the same manner as mentioned above.

In this case, heat pressing is performed in a state in which the lower surface (flat surface) of the resin sheet member 33 of the upper heating and pressure-applying device 30 is in contact with the upper surface of the upper insulating film 11 and the upper surface (flat surface) of the resin sheet member 33 of the lower heating and pressure-applying device 30 is in contact with the lower surface of the lower insulating film 12. At this time, the protruding portion forming dented portions 35 and 35 are formed at the regions of the laminated surface of the hard member 31 corresponding to both widthwise side edges 21 and 22 of the metal plate 2 and the vicinities thereof. Therefore, portions of the resin sheet member 33 corresponding to the protruding portion forming dented portions 35 and 35 are readily dented at the time of heat pressing. For this reason, the tab lead 1 (as shown in FIGS. 1 to 3) can be produced in which the first protruding portions 11a and 11a are formed at regions of the first insulating film 11 corresponding to both widthwise side edges 21 and 22 of the metal plate 2 and vicinities thereof so as to protrude outward in the thickness direction of the first insulating film 11, and second protruding portions 12a and 12a are formed at regions of the second insulating film 12 corresponding to both widthwise side edges 21 and 22 of the metal plate 2 and vicinities thereof so as to protrude outward in the thickness direction of the second insulating film 12.

The material of the hard member 31 constituting the heating and pressure-applying device 30 is not specifically limited. For example, a metal (e.g., aluminum, steel, etc.) can be exemplified as the material.

The material of the resin sheet member 33 constituting the heating and pressure-applying device 30 is not specifically limited. For example, synthetic resin (e.g., polyolefin resin, fluorine resin, etc.), synthetic resin elastomer (e.g., olefin series elastomer, silicone series elastomer, urethane series elastomer, etc.), rubber (e.g., fluorine rubber, silicone rubber, urethane rubber, etc.) can be exemplified as the material.

The rubber hardness of the resin sheet member 33 preferably falls within the range of 20-95 degrees. As the resin sheet member 33, a sheet member formed by laminating a variety of types of resin sheets different in rubber hardness can be used.

Three examples of physical properties of resin which can be used for the resin sheet member 33 are shown below. However, it should be noted that the resin is not specifically limited to them having the following physical properties.
1) Fluorine resin
   thermal expansion rate: $3.0 \times 10^{-4\circ}$ C.,
   thermal conductivity: 0.2 W/m·K, and
   specific heat capacity: 1,600 J/kg·K
2) Silicone rubber
   thermal expansion rate: $1.6 \times 10^{-4\circ}$ C.,
   thermal conductivity: 0.23 W/m·K, and
   specific heat capacity: 1,650 J/kg·K The depth D of the protruding portion forming dented portion 35 and 36 is preferably set so that the dent rate calculated by the following formula falls within the range of 5-100%. In the following formula, the thickness of the insulating film is a total thickness of the two upper and lower films.

$$\text{Dent rate}(\%) = \{\text{depth } D/(\text{thickness of metal plate} \times 0.5 + \text{thickness of insulating film} \times 0.5)\} \times 100$$

Figure 8:
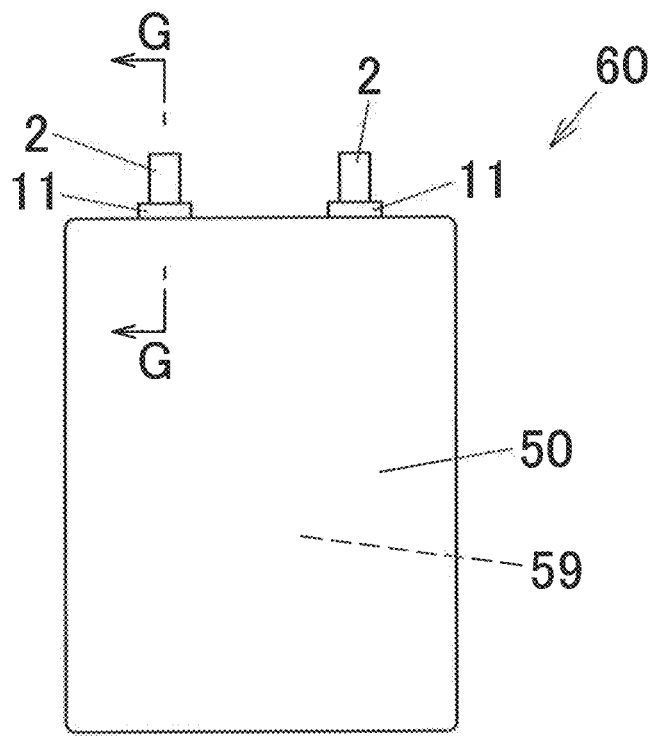
FIG. 8 is a plan view showing an embodiment of a battery having tab leads according to the present invention.

One embodiment of a battery 60 constituted using the tab lead 1 according to the present invention is shown in FIG. 8. The battery T of this embodiment is a non-aqueous electrolyte secondary battery. This battery 60 is constituted such that film-like positive electrodes and film-like negative electrodes are stacked via separators and non-aqueous electrolyte is interposed between the positive electrode and the negative electrode so as to be charged/discharged by transmission of lithium ion. The battery main body 59 containing these positive electrodes, negative electrodes and electrolyte is covered by an outer casing body 50 in a fluid-tight manner, i.e., sealed inside the outer casing body 50 (see FIG. 8).

One end portion of the positive electrode tab lead 1 is electrically connected to the positive electrode, and the other end portion of the positive electrode tab lead 1 is exposed (extended) outside of the outer casing body 50 (See FIGS. 8 and 9). As shown in FIG. 9, the edge portions of the outer casing body 50 are arranged so as to sandwich the insulating films 11 and 12 arranged on both surfaces of the intermediate region of the positive electrode tab lead 1 in the length direction of the metal plate 2, and the edge portions of the inner layers 51 of the outer casing bodies 50 are sealed and joined to the insulating films 11 and 12 of the tab lead 1 with heat sealing, etc.

Also, one end portion of the negative electrode tab lead is electrically connected to a negative electrode, and the other end portion of the negative electrode tab lead 1 is exposed (extended) outside of the outer casing body 50 (See FIGS. 8 and 9). As shown in FIG. 9, the edge portions of the outer casing body 50 are arranged so as to sandwich the insulating films 11 and 12 arranged on both surfaces of the intermediate region of the positive electrode tab lead 1 in the length direction of the metal plate 2, and the edge portions of the inner layers 51 of the outer casing bodies 50 are sealed and joined to the insulating films 11 and 12 of the tab lead 1 with heat sealing, etc.

The material of the positive electrode is not specifically limited, and known positive electrode material can be used as the material of a non-aqueous electrolyte battery. Specifically, for example, a positive electrode formed by coating and drying a mixed compound of lithium salt ($LiCoO_2$, $LiNiO_2$, $LiMnO_2$, $LiFeO_2$) as cathode active material, carbon powder which is a conductant agent, and PVDF as a binding agent on an aluminum plate as a positive electrode current collector can be exemplified. The carbon powder is not specifically limited. For example, graphite powder, granular graphite, fullerene graphite, and carbon nanotubes can be exemplified.

Also, the negative electrode is not specifically limited. For example, known negative electrode material can be used as a material for a non-aqueous electrolyte battery. Specifically, for example, a negative electrode formed by coating and drying a mixed compound of graphite powder as cathode active material and PVDF as a binding agent on a surface of an copper plate as the negative electrode current collector can be exemplified.

The material of the electrolyte is not specifically limited. For example, known non-aqueous electrolyte can be used as a material for non-aqueous electrolyte battery. As the non-aqueous electrolyte, gel-type non-aqueous electrolyte containing non-aqueous medium and electrolyte is preferably used. The non-aqueous medium is not specifically limited. For example, ethylene carbonate and propylene carbonate can be exemplified as the non-aqueous medium. The electrolyte is not specifically limited. For example, $LiPF_6$ and $LiClO_4$ can be exemplified as the electrolyte.

Also, the separator is not specifically limited. For example, known separators for a non-aqueous electrolyte battery can be used. Specifically, a separator made of porous polypropylene can be exemplified.

As the outer casing body 50, an outer casing body in which a heat-resistant resin layer (outer layer) 53 is integrally laminated on one surface of the metal foil layer 52 and a thermoplastic resin layer (inner layer) 51 is integrally laminated on the other surface of the metal foil layer 52 can be exemplified. Among them, the outer casing body 50 is preferred to have a structure in which a heat-resistant resin layer (outer layer) 53 is integrally laminated on an upper surface of a metal foil layer 52 via a first adhesive agent layer and a thermoplastic resin layer (inner layer) 51 is integrally laminated on a lower surface of the metal foil layer 52 via a second adhesive agent layer.

The heat-resistant resin layer (outer layer) 53 is not specifically limited. For example, a layer made of a stretched film of a polyamide film like, e.g., nylon film or a polyester film, etc., is preferably used. Among them, as the heat-resistant resin layer 53, it is especially preferable to use a biaxially-stretched polyamide film, such as, e.g., a biaxially-stretched nylon film, a biaxially-stretched polybutylene telephthalate (PBT) film, a biaxially-stretched polyethylene telephtalate (PET) film, or a biaxially-stretched polyethylene naphthalate (PEN) film. The nylon film is not specifically limited. For example, nylon film 6, nylon film 6, 6, and an MXD nylon film can be exemplified as the nylon film. It should be noted that the heat-resistant resin layer 53 can be formed by a single layer, or a multiple layer made of polyester films/polyamide films (multiple layer made of PET films/nylon films). It is preferable that the thickness of the heat-resistant resin layer 53 is 12-50 μm.

The heat-resistant resin layer (inner layer) 51 is configured to provide excellent chemical resistance against strong corrosive electrolytes used in a lithium ion secondary battery and provide heat sealing properties to packing materials.

The thermoplastic resin layer 51 is not specifically limited, but it is preferred to be an unstretched thermoplastic resin film layer. The unstretched thermoplastic resin film layer is not specifically limited, but is preferably made of an unstretched film made of at least one of thermoplastic resins selected from a group consisting of polyethylene, polypropylene, olefin series co-polymer, acid modified matters thereof and ionomers. The thickness of the thermoplastic resin layer 51 is preferably set to be 20-80 μm.

The metal foil layer 52 functions to provide a gas barrier to prevent penetration of oxygen and/or water into the outer casing body 50. The metal foil layer 52 is not specifically limited. For example, an aluminum foil and a copper foil can be exemplified as the metal foil layer. An aluminum foil is generally used. The thickness of the metal foil layer 52 is preferred set to 20-100 μm. By setting the thickness to 20 μm or more, generation of pinholes can be prevented at the time of rolling when producing the metal foil. By setting the thickness to 100 μm or less, the stress at the time of bulging and drawing can be reduced, which in turn can improve the formability.

EXAMPLES

Next, specific examples of the present invention will be explained. The present invention is not specifically limited to these examples.

Example 1

A metal plate 2 (length 50 mm×width 50 mm) having a nickel plated layer of a thickness of 2 μm formed on a surface of a copper plate having a thickness of 200 μm, and two sheets of resin insulating films 11 and 12 of length 70 mm×width 10 mm×thickness 100 μm were prepared (see FIG. 4).

Also, a pair of upper and lower heating and pressure-applying devices 30 each made by integrally laminating a fluorine resin sheet member 33 having a rubber hardness of 60 degrees to one surface of an approximately plate-shaped metal hard member 31 were prepared (see FIG. 4). On the non-laminated surface of the resin sheet member 33 (the surface which comes into contact with the insulating film at the time of heat pressing), a dented portion 34 having approximately the same shape as the insulating film in plan view.

Next, the insulating films 11 and 12 were arranged on both surfaces of the metal plate 2 so as to cover a part of a region of the surface of the metal plate 2 in the length direction, and were sandwiched by and between the pair of upper and lower heating and pressure-applying devices 30 and 30 to be heat pressed (see FIG. 4). At this time, the heating and pressure-applying devices 30 were arranged on top and bottom in a state in which each resin sheet member 33 faced each other (see FIG. 4). The temperature of the heating and pressure-applying device 30 at the time of heat pressing was set to 190° C., the applied pressure of the heating and pressure-applying device was set to 1,000 N, and the heat pressing time was set to 7 seconds. By conducting the heat pressing, the tab lead 1 having the structure as shown in FIG. 3 was obtained.

Figure 10:
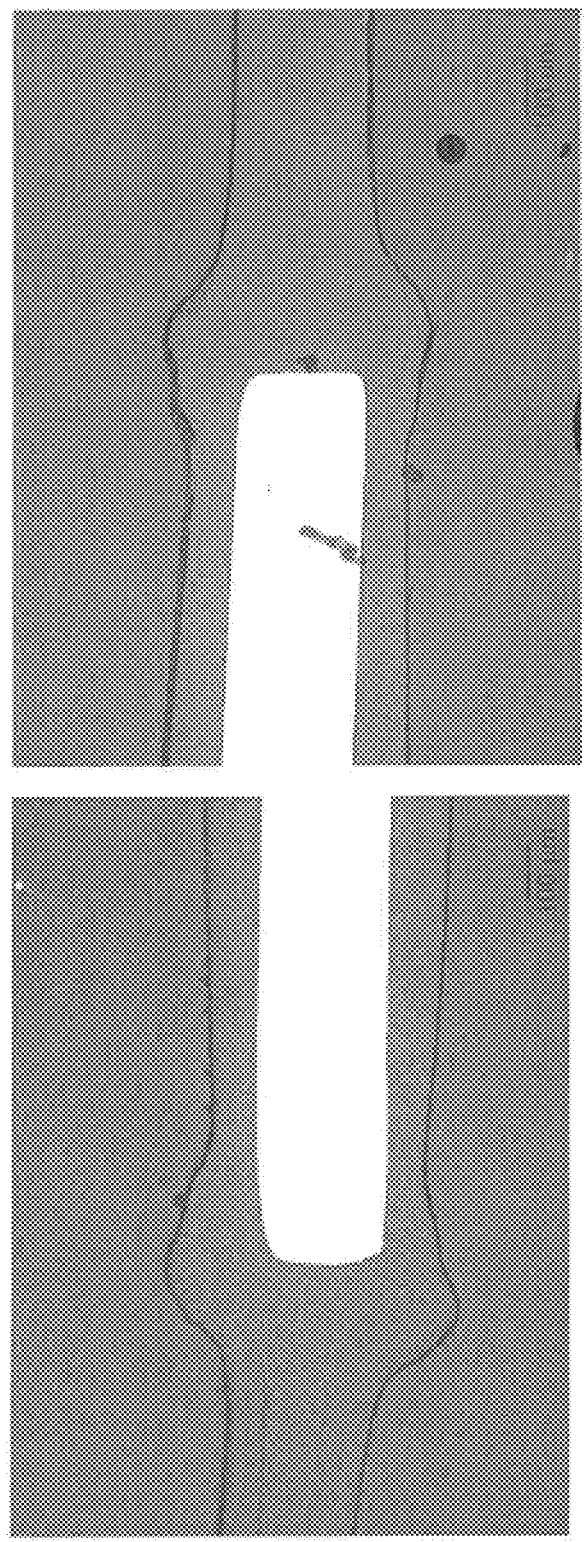
FIG. 10 is an optical microscopic photograph showing a cross-section of the tab lead obtained in Example 1.

The cross section of the obtained tab lead 1 was photographed with an optical microscope. The enlarged image (see FIG. 10) revealed that the first protruding rate was 2.5% and the second protruding rate was 2.5%.

Example 2

A tab lead 1 having the structure as shown in FIG. 3 was obtained in the same manner as in Example 1 except that the temperature of the heating and pressure-applying device was set to 210° C., the applied pressure by the heating and pressure-applying device was set to 1,000 N and the heat pressing time was set to 7 seconds.

The cross section of the obtained tab lead 1 was photographed with an optical microscope. The enlarged image revealed that the first protruding rate was 50% and the second protruding rate was 50%.

Example 3

A tab lead 1 having the structure as shown in FIG. 3 was obtained in the same manner as in Example 1 except that the temperature of the heating and pressure-applying device was set to 240° C., the applied pressure by the heating and pressure-applying device was set to 1,000 N and the heat pressing time was set to 7 seconds.

The cross section of the obtained tab lead 1 was photographed with an optical microscope. The enlarged image revealed that the first protruding rate was 90% and the second protruding rate was 90%.

Comparative Example 1

A tab lead 1 having the structure was obtained in the same manner as in Example 1 except that the temperature of the heating and pressure-applying device was set to 160° C., the applied pressure by the heating and pressure-applying device was set to 1,000 N and the heat pressing time was set to 7 seconds.

The cross section of the obtained tab lead 1 was photographed with an optical microscope. The enlarged image revealed that the first protruding rate was 0%, the second protruding rate was 0%, no protruding portion was formed.

Evaluations were conducted based on the following evaluation method for each tab lead obtained in the aforementioned manner. The results are shown in Table 1.

TABLE 1

|  | First protruding rate (%) | Second protruding rate (%) | Insulation Evaluation Result Example (presence or absence of short-circuit) |
|---|---|---|---|
| Example 1 | 2.5 | 2.5 | ○ |
| Example 2 | 50 | 50 | ○ |
| Example 3 | 90 | 90 | ○ |
| Comparative Example 1 | 0 | 0 | X |

<Insulation Evaluation Method (Evaluation for Presence or Absence of Short-Circuit)>

In a state in which the outer casing body 50 was laminated on both surfaces of the tab lead 1, heat sealing was performed with a heat sealing temperature of 220° C., an applied pressure of 1.5 kN for 15 seconds (See FIG. 9). As the outer casing body 50, an outer casing film made by laminating a biaxially-stretched nylon film (outer layer) 53 having a thickness of 20 μm on one surface of an aluminum foil (metal layer) 52 having a thickness of 40 μm and laminating an unstretched polypropylene film (inner layer) having a thickness of 40 μm on the other surface of the aluminum foil was used. The conditions for heat sealing the outer casing body were set to be more stringent than general conditions.

Next, the cross section of the member in which the outer casing body 50 was heat sealed on both surfaces of the tab lead was photographed with an optical microscope. By inspecting the enlarged image, the existence or absence of short-circuit between the metal plate 2 of the tab lead and the metal layer 52 of the outer casing body was examined. "o" (pass) denotes absence of short-circuit and "x" (fail) denotes existence of short-circuit.

As it is apparent from Table 1, in the tab leads of Examples 1 to 3 of the present invention, even if the outer casing body was heat sealed with stringent heat sealing conditions, short-circuit did not occur between the metal plate of the tab lead and the metal layer of the outer casing body and sufficient insulation was secured. Therefore, it was confirmed that even if the outer casing body was heat sealed to the tab lead of the present invention with stringent heat sealing conditions to prevent possible leaking of electrolyte in the battery, sufficient insulation could be secured without causing short-circuit.

On the other hand, in the tab lead of Comparative Example 1 with no protruding portion, it was found that short-circuit occurred when the outer casing body was heat sealed under stringent heat sealing conditions.

INDUSTRIAL APPLICABILITY

The tab lead according to the present invention is suitably used as an electric terminal of an electrochemical device, such as, e.g., a secondary battery like a lithium ion secondary battery and a capacitor, but not specifically limited to those usages.

DESCRIPTION OF THE REFERENCE NUMERALS

1: tab lead
2: metal plate
11: first insulating film
11*a*: first protruding portion
11*b*: first flat portion
12: second insulating film
12*a*: second protruding portion
12*b*: second flat portion
21: edge of metal plate (end edge)
22: edge of metal plate (end edge)
30: heating and pressure-applying device
31: hard member
32: dented portion (hard body)
33: resin sheet member
34: dented portion (resin sheet member)
35: protruding portion forming dented portion (hard body)
36: protruding portion forming dented portion (resin sheet member)

The invention claimed is:
1. A tab lead comprising:
a metal plate;
a first insulating film made of resin adhered to one of surfaces of a part of a region of the metal plate in a length direction of the metal plate; and
a second insulating film made of resin adhered to the other of surfaces of the part of the region; wherein
both end portions of the first insulating film and both end portions of the second insulating film are integrally welded to each other,
first protruding portions are formed in the first insulating film to extend along both widthwise side edges of the metal plate or a vicinity thereof so as to protrude outward in a thickness direction of the first insulating film, and
second protruding portions are formed in the second insulating film to extend along both widthwise side edges of the metal plate or a vicinity thereof so as to protrude outward in a thickness direction of the second insulating film.

2. The tab lead as recited in claim 1, wherein a first protruding rate calculated by a following calculating formula falls within a range of 1-100%, first protruding rate (%)={$(X-Y)/Y$}×100, where "X" (μm) is a maximum thickness of the first protruding portion of the first insulating film, and "Y" (μm) is a thickness of a portion of the first insulating film corresponding to an intermediate portion of the metal plate in a width direction of the metal plate, and a second protruding rate calculated by a following calculating formula falls within a range of 1-100%, second protruding rate (%)={$(V-W)/W$}×100, where "V" (μm) is a maximum thickness of the second protruding portion of the second insulating film, and "W" (μm) is a thickness of a portion of the second insulating film corresponding to the intermediate portion of the metal plate in the width direction of the metal plate.

3. The tab lead as recited in claim 2, wherein a relationship of 100 μm≤Y≤250 μm and a relationship of 100 μm≤W≤250 μm are met.

4. The tab lead as recited in claim 1, wherein an apex of the first protruding portion is positioned outside of a widthwise side edge of the metal plate corresponding to the first protruding portion and an apex of the second protruding portion is positioned outside of a widthwise side edge of the metal plate corresponding to the second protruding portion.

5. The tab lead as recited in claim 1, wherein an intermediate portion of the first insulating film between the first protruding portions defines a first flat portion; and an intermediate portion of the second insulating film between the second protruding portions defines a second flat portion.

6. The tab lead as recited in claim 1, wherein no protruding portions are formed elsewhere in the first insulating film or the second insulating film.

* * * * *